Nov. 24, 1953 — L. M. CULP — 2,660,103
COMBINATION METERING AND VIEW FINDING CAMERA WITH SWIVEL HANDLE GRIP
Filed May 28, 1951 — 2 Sheets-Sheet 1

INVENTOR.
Lyle M. Culp
BY Sam J. Slotsky
ATTORNEY

Nov. 24, 1953  L. M. CULP  2,660,103
COMBINATION METERING AND VIEW FINDING
CAMERA WITH SWIVEL HANDLE GRIP
Filed May 28, 1951  2 Sheets-Sheet 2
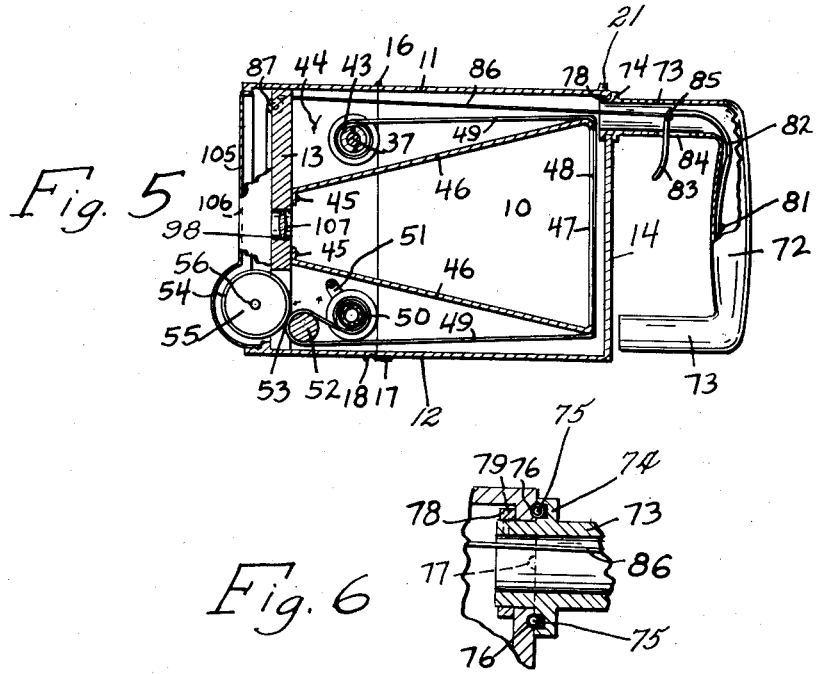
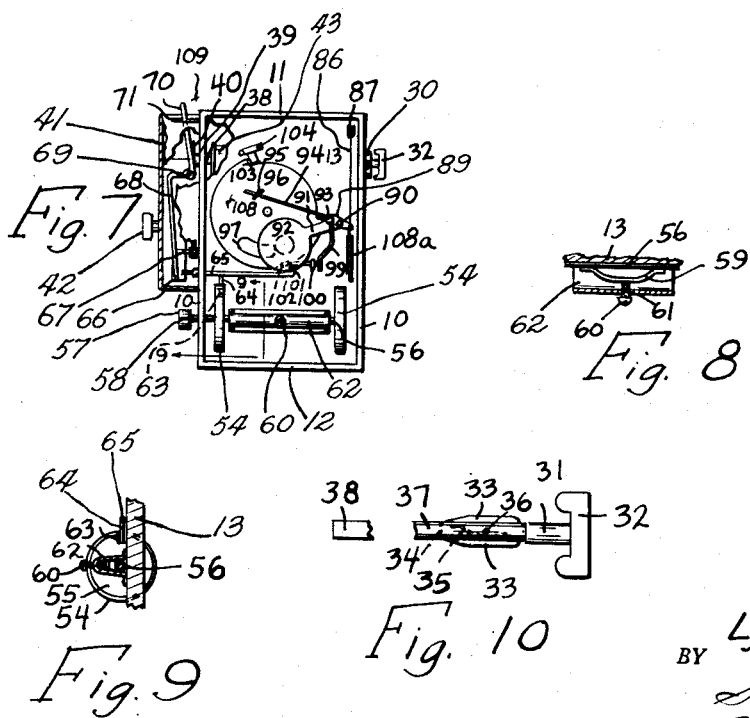
INVENTOR.
Lyle M. Culp
BY
Sam J. Slotsky
ATTORNEY Patented Nov. 24, 1953

2,660,103

UNITED STATES PATENT OFFICE 2,660,103

COMBINATION METERING AND VIEW FINDING CAMERA WITH SWIVEL HANDLE GRIP

Lyle M. Culp, Colman, S. Dak.

Application May 28, 1951, Serial No. 228,671

2 Claims. (Cl. 95—86)

My invention relates to a camera construction.

An object of my invention is to provide a camera construction which includes a handle grip atttached to the camera so that the camera can be swung to vertical or lateral position for taking the pictures in either position.

A further object of my invention is to provide a view finding device which is simple to operate, and readily adjustable to the person using the camera.

A further object of my invention is to provide a metering device which automatically feeds the camera film the correct distance after the shutter is actuated.

A further object of my invention is to provide a film spool holding arrangement which will be accommodated to any size of spool.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 3:
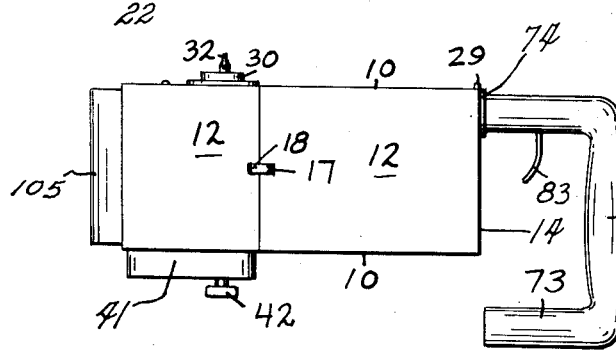
Figure 4:
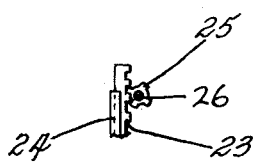

Figure 3 is a view of the camera showing the camera housing swung to the horizontal position, Figure 4 is a detail, Figure 5 is a sectional view taken generally along the longitudinal axis of the camera, Figure 6 is a detail, Figure 7 is an end view with the front casing removed with fragmentary sections, Figure 8 is a detail, Figure 9 is a sectional view taken substantially along the lines 9—9 of Figure 7, and Figure 10 is a detail.

I have used the character 10 to designate the side walls of the camera, the character 11 the top wall, the character 12 the bottom wall, the character 13 the forward wall, and the character 14 the rear wall. The various walls are split along the line 15 with the wall 11 being hinged at 16, with a spring clip 17 serving to lock the camera together, the clip 17 including the portion 18 which falls into a suitable recess. This arrangement thereby provides a convenient structure wherein the rear half of the camera can be swung in the direction of the arrow 19 thereby exposing the working parts inside, and allowing insertion of the film and the like, this structure also eliminating the need for a separate interior housing. If desired, the line 15 can continue along the dotted portions 20 to allow easier access to certain of the rolls, although this is not essential.

Attached to the top wall 11 is a sight 21, and also secured to the end of the top wall 11, or the stationary portion, are a pair of spaced buttons 22 attached to the gear racks 23 which gear racks pass through the keepers 24 which are attached to the wall 11, the gear racks 23 being adapted to mesh with the small gear 25 (see Figure 4) which is attached to a shaft 26 which is attached to a button 27, the shaft 26 passing through the wall 11. The buttons 22 can include small extending pins passing within the slots 28, which slots are provided in the wall 11, and need not pass all the way through, this arrangement serving to guide the buttons 22.

Figure 1:
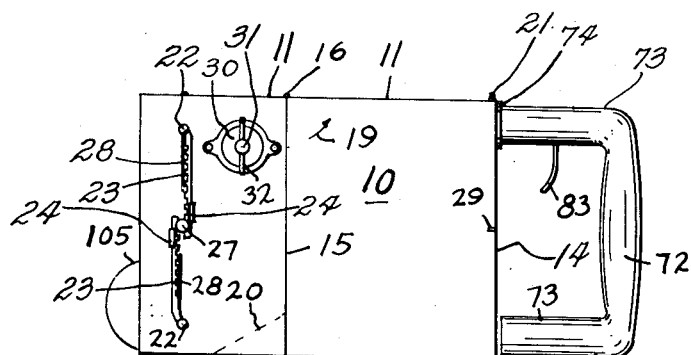
Figure 1 is a side elevation of the camera.

The character 29 indicates a further sight located on the side wall 10, and it will be noted from Figure 1 that an identical arrangement of buttons 22, gear racks 23, etc. are also provided on the side 10. The button 22 on the upper portion of Figure 1 can be made longer to clear the boss 30 so that it will be visible, the boss 30 serving to receive the rod 31 having the turning handle 32, the rod 31 being adapted to be journalled within the boss 30. The rod 31 further includes a pair of ears 33 (see Figure 10) received in a suitable slot 34, with a leaf spring 35 being attached to both members 33 with a pin 36 serving to keep the members together, each end of the leaf spring being attached to alternate portions 33. This spring urged arrangement permits any size of spool to be attached to the shaft 37 which is a continuation of the shaft 31, the shaft 37 extending into the square portion 38 at the extremity thereof. The square portion 38 is adapted to be received at 39 (see Figure 7) within a socket attached to a gear 40 which is a portion of a suitable spring wound mechanism of any desired type enclosed within a casing 41 and having the winding key 42, this winding mechanism thereby being adapted to rotate the spool 43 (see Figure 5) which is mounted on the shaft 37, in the direction of the arrow 44.

Attached to the forward wall 13 at 45 are the straps or framework portions 46 which extend into the side portions 47 leaving a clear space at 48 for the exposure of the film 49, this film being the film that is rolled upon the various spools, this film also passing over the spool 50 suitably journalled to the clips 51, the film however first passing over the idler roller 52. Firmly engaged with the film at 53 are the annular bands 54 which are made of rubber or other frictionally engageable material, and which are mounted on the pair of discs 55, which are attached to a shaft 56 which shaft passes through one of the side walls 10 and terminates in the rotatable button 57 having the marking 58 which indicates when the film is in its initial position.

The shaft 56 bears against the wall 13, and bearing against the shaft 56 is a leaf spring member 59 against which bears the end of a machine screw 60 threadably engaged at 61 with the keeper 62 which is also secured to the wall 13, this arrangement serving to maintain any desired tensional adjustment against the shaft 56.

One of the discs 55 includes an indented slot 63 in which is received the short pin 64 which is attached to a horizontal rod 65, the end of which rod 65 is shown bearing against the rotatable member 66, the rotatable member 66 being in the form of a flat strip which is rotated by means of the shaft 67, which is driven by the chain of gears in the spring arrangement. Also bearing against the member 66 is the rod 68 which is pivoted at 69 to a framework portion of the spring mechanism and continues into the lever 70 passing within a slot 71.

Figure 2:
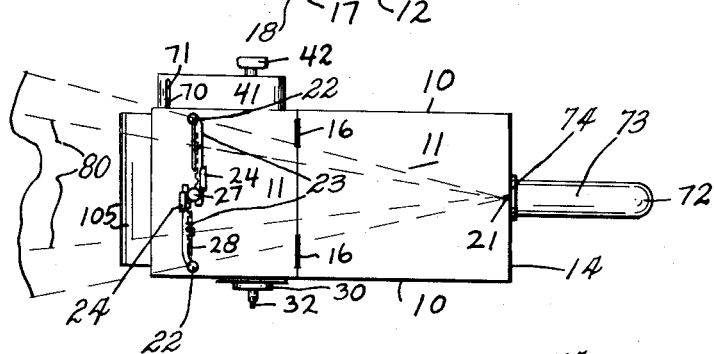
Figure 2 is a plan view of Figure 1.

The character 72 indicates a handle member which is approximately U-shaped as shown, and which includes the end portions 73, one of which is rotatably secured within the wall 14, the portions 73 including flanges 74 having the spring urged balls 75 therein adapted to register within the depression 76, it being noted that a pair of further depressions 77 are provided, so that the handles 72 can be swung to the position shown in Figure 3 and firmly supported in this position. The portion 73 further includes a collar 78 pinned thereto at 79, this arrangement thereby serving to provide firm supporting means, whereby the camera can be carried, with the members 72 functioning as a handle, and whereby the camera can be aimed at an object to take the picture thereof, either in the position shown in Figure 1 or as shown in Figure 3. By turning the centrally positioned buttons 27 it will be noted that the gear racks will be drawn inwardly or outwardly, thereby moving the buttons 22. In this way, the operator can sight the object along either of the dotted lines 80, for instance, as shown in Figure 2, which will accommodate the view to the length of the operator's arm, thereby providing a convenient adjusting view finder which can be quickly manipulated.

Attached at 81 within the handle 72 is an arcuate spring bar 82 terminating in a trigger 83 passing through a slot 84, and attached to the trigger 83 at 85 is a thin wire or cable 86 passing over a pulley 87, which cable is then attached at 88 (see Figure 7) to a lever 89 pivotally attached at 90 to the wall 13, with the lever continuing into the portion 91 which is an integral extension of the disc shade 92. Attached at 93 to the lever 89 is a lengthened spring wire 94 which is engaged at 95 with the shutter 96 including a shutter opening 97 adapted to cover the lens opening 98 during actuation of the mechanism. Also attached at 93 is a spring member 99 which bears against the end of the rod 65 which passes through the small keeper 100, the rod 65 including the upwardly bent portion 101 which bears against the small lip 102 which is bent out of the shutter disc 96, the disc 96 also including an ear 103 bearing against the member 104 which is secured to the wall 13. A casing 105 which slips into the end of the arrangement covers the forward end thereof and includes an opening 106 registering with the lens 107.

It will now be noted that the camera can be aimed at an object with the pictures being taken vertically or horizontally as explained heretofore, and with the view finding arrangements being adjustably fixed.

As soon as the trigger 83 is pulled rearwardly, the cable 86 is pulled against the spring 103a which correspondingly pivots the lever 89 and lever portion 91, releasing the spring 99 from the end of the rod 65. At this moment the wire 94 will cause the disc 96 to rotate in the direction of the arrow 108, which causes the lip 102 to bear against the portion 101 of the rod 65, thereby taking the pin 64 out of engagement with the slot 63 in the disc 55. At the same time, the end of the rod 65 is dis-engaged from the rotating strip 66 which allows the spring mechanism to operate, and thereby rolls the film 49 on the spool 43. The frictional engagement of the annular bands 54 with the film at 53 will allow a certain amount of film to be drawn out, this amount corresponding to the circumference of the bands 54, and with the pin 64 riding against the side of the disc 55 as soon as the trigger has been released, the pin thus riding against the side of the member 55 until it again reaches the notch or depression 63, whereby it will snap into place and lock the metering arrangement so that no more film is advanced. Meanwhile, the disc 96 and shade 92 have returned to their original position, ready for the next film portion to be advanced.

The lever 70 when swung in the direction of the arrow 109 serves to release the member 66 for operation, the lever as shown in the position in Figure 7 keeping the arrangement in its locked position before it is ready for operation. In this manner, the film is advanced only the necessary distance, the picture can be taken instantly, just before the film is advanced.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A camera including a camera body, a handle member attached to said camera body, said handle member being substantially U-shaped, one of the sides of said handle member being pivoted to said camera body whereby said camera can be swung to a position at right angles to said handle member, view finders attached to said camera body including pairs of spaced buttons attached at the top and side of said camera body, means for adjustably spacing said buttons inwardly or outwardly, centrally positioned sighting members attached to said camera body for sighting with respect to said buttons.

2. A camera including a camera body, a handle member attached to said camera body, said handle member being substantially U-shaped, one of the sides of said handle member being pivoted to said camera body whereby said camera can be swung to a position at right angles to said handle member, view finders attached to said camera body including pairs of spaced buttons attached at the top and side of said camera body, means for adjustably spacing said buttons inwardly or outwardly, centrally positioned sighting members attached to said camera body for sighting with respect to said buttons, said adjustable spacing means including gear racks attached to said buttons, a centrally positioned gear member engaging said gear racks, whereby rotation of said centrally positioned gear member will adjustably position the buttons.

LYLE M. CULP.

References Cited in the file of this patent

UNITED STATES PATENTS

| Number | Name | Date |
|---|---|---|
| 624,693 | Sheffield | May 9, 1899 |
| 1,053,400 | Johnson | Feb. 18, 1913 |
| 1,103,418 | Johnson | July 14, 1914 |
| 1,236,419 | Folmer | Aug. 14, 1917 |
| 2,042,983 | Fairchild | June 2, 1936 |
| 2,186,633 | Drotning | Jan. 9, 1940 |
| 2,261,953 | Brown | Nov. 11, 1941 |
| 2,313,088 | Potts | Mar. 9, 1943 |
| 2,539,764 | Wisegarver | Jan. 30, 1951 |